US009111335B2

(12) United States Patent
Kaku

(10) Patent No.: US 9,111,335 B2
(45) Date of Patent: Aug. 18, 2015

(54) ELECTRONIC ENDOSCOPE SYSTEM AND IMAGE PROCESSING METHOD

(75) Inventor: Toshihiko Kaku, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 828 days.

(21) Appl. No.: 13/303,003

(22) Filed: Nov. 22, 2011

(65) Prior Publication Data

US 2012/0188351 A1 Jul. 26, 2012

(30) Foreign Application Priority Data

Jan. 24, 2011 (JP) ................................ 2011-011699

(51) Int. Cl.
*H04N 7/18* (2006.01)
*G06K 9/00* (2006.01)
*G06T 7/00* (2006.01)

(52) U.S. Cl.
CPC .............. *G06T 7/0016* (2013.01); *G06T 7/0081* (2013.01); *G06T 2207/10016* (2013.01); *G06T 2207/10064* (2013.01); *G06T 2207/10068* (2013.01); *G06T 2207/20012* (2013.01); *G06T 2207/20132* (2013.01); *G06T 2207/20148* (2013.01); *G06T 2207/30101* (2013.01)

(58) Field of Classification Search
CPC .......... G06T 2207/10064; G06T 2207/10068; G06T 2207/20132; G06T 2207/30101
See application file for complete search history.

(56) References Cited

U.S. PATENT DOCUMENTS

| 5,059,796 | A * | 10/1991 | Nakamura | 250/330 |
|---|---|---|---|---|
| 6,621,917 | B1 * | 9/2003 | Vilser | 382/128 |
| 8,520,134 | B2 * | 8/2013 | Gomi et al. | 348/354 |
| 2007/0076975 | A1 * | 4/2007 | Abe | 382/274 |
| 2007/0173692 | A1 * | 7/2007 | Homan et al. | 600/118 |
| 2009/0109178 | A1 * | 4/2009 | Kim et al. | 345/166 |
| 2009/0129657 | A1 * | 5/2009 | Huo et al. | 382/132 |
| 2009/0227837 | A1 * | 9/2009 | Shimizu et al. | 600/109 |
| 2009/0268012 | A1 * | 10/2009 | Scott et al. | 348/45 |

(Continued)

FOREIGN PATENT DOCUMENTS

JP 1991(3)-275028 A 12/1991
JP 2000-148987 A 5/2000

(Continued)

OTHER PUBLICATIONS

Notification of Reason(s) for Refusal dated Jan. 24, 2013, with English translation.

(Continued)

*Primary Examiner* — Dave Czekaj
*Assistant Examiner* — Md Haque
(74) *Attorney, Agent, or Firm* — McGinn IP Law Group Pllc

(57) ABSTRACT

In an electronic endoscope system, a changed-area detector detects a changed area from an image captured by an endoscope, the changed area having different features from other area of the captured image. A mask data produce produces mask data based on the detected changed area, the mask data allocating an image processing parameter to each pixel of the captured image such that the changed area is processed in a different way from the other area. An image processor processes the captured image according to the mask data. Thus, an image area corresponding to an artificial object like a surgical tool may be detected as the changed area and excluded from unnecessary image processing.

19 Claims, 14 Drawing Sheets

(56) References Cited

U.S. PATENT DOCUMENTS

2010/0157038 A1* 6/2010 Hitokata .................. 348/68
2010/0316273 A1* 12/2010 Inoue et al. .................. 382/128

FOREIGN PATENT DOCUMENTS

JP    2001-154232 A    6/2001
JP    2002-065586 A    3/2002

OTHER PUBLICATIONS

European Search Report dated May 27, 2013.
Reiter A et al: "An online learning approach to in-vivo tracking using synergistic features", Intelligent Robots and Systems (IROS), 2010 IEEE/RSJ International Conference on IEEE, Piscataway, NJ, USA, Oct. 18, 2010, pp. 3441-3446, XP031920512, DOI: 10.1109/IROS.2010.5650852 ISBN: 978-1-4244-6674-0 abstract p. 3441, left-hand column, lines 1-14 p. 3442, right-hand column, line 26—p. 3443, right-hand column, line 10.
Yu Cao et al: "Computer-Aided Detection of Diagnostic and Therapeutic Operations in Colonoscopy Videos", IEEE Transactons on Biomedical Engineering, IEEE Service Center, Piscataway, NJ, USA, vol. 54, No. 7, Jul. 1, 2007, pp. 1268-1279, XP011185527, ISSN: 0018-9294, DOI: 10.1109/TBME.2007.890734 abstract p. 1268, right-hand column, lines 9-15 p. 1269, left-hand column, line 51—p. 1270, right-hand column, line 5 sections "IV.V. Indentification of Insertion Direction of Instruments ", "IV.C. Region Filtering", "IV.D. Region Merging".

* cited by examiner

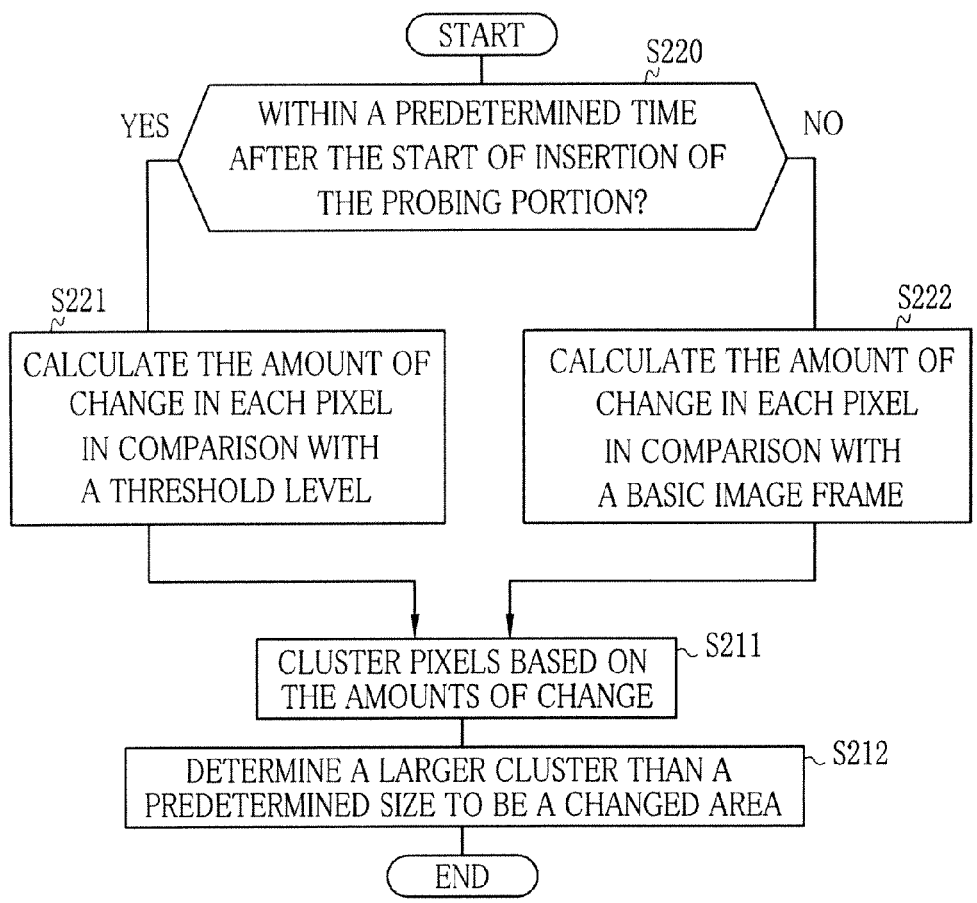

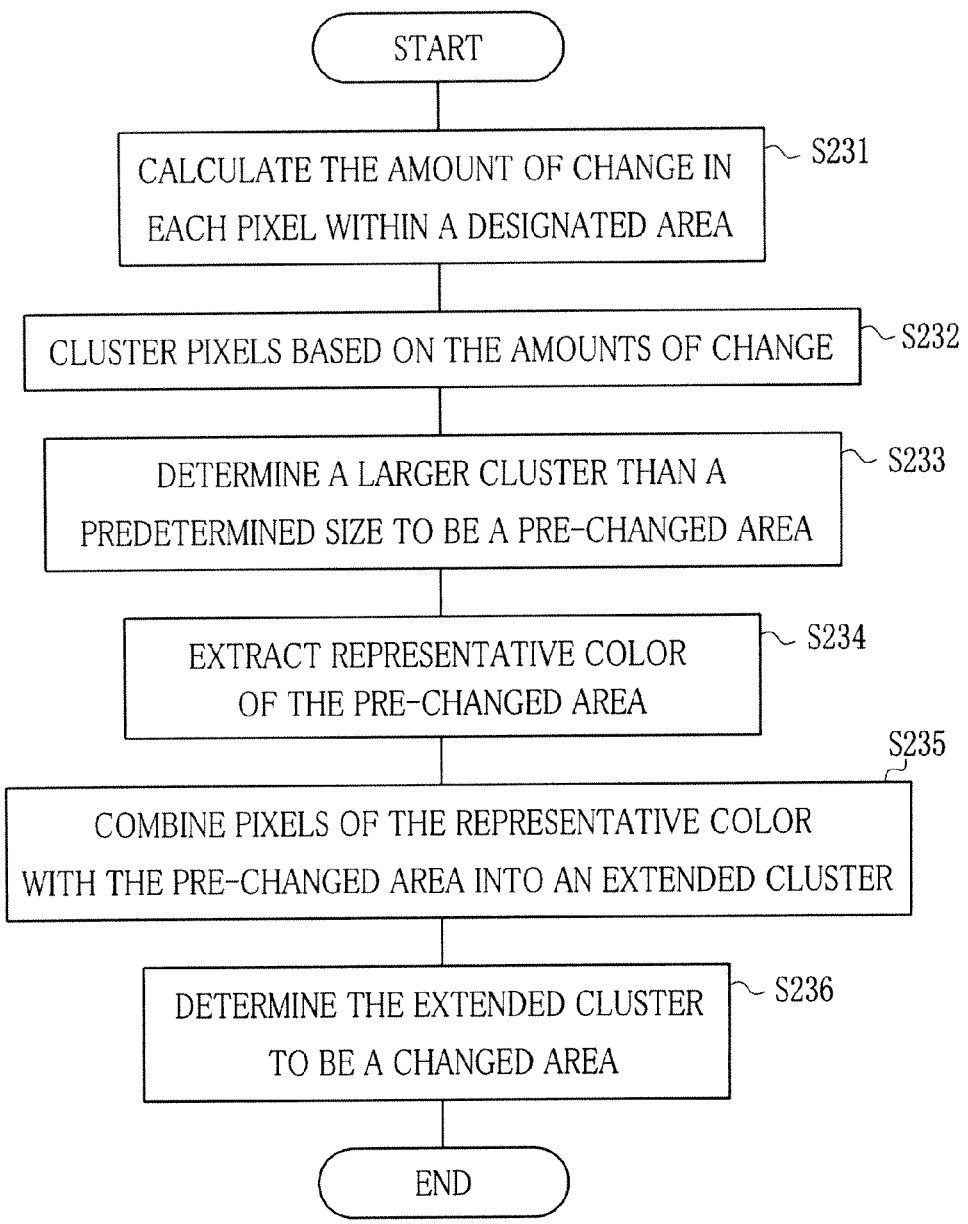

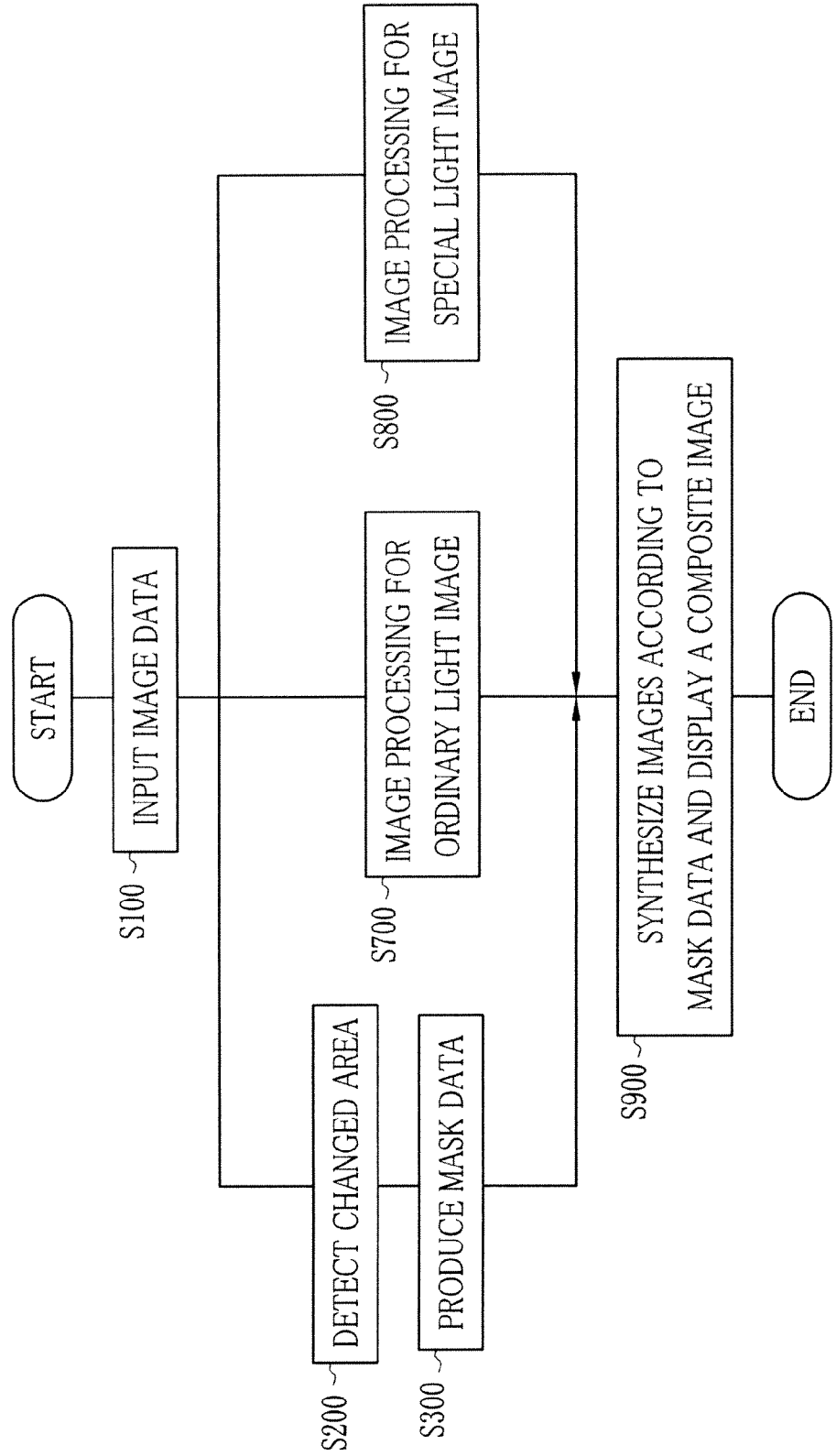

ELECTRONIC ENDOSCOPE SYSTEM AND IMAGE PROCESSING METHOD

BACKGROUND OF THE INVENTION

1. Field of the Invention

The present invention relates to an electronic endoscope system that acquires images from inside of a test subject through an electronic endoscope. The present invention also relates to an image processing method for the electronic endoscope system.

2. Description of the Related Art

In the medical field, electronic endoscopes have been widely used for diagnoses, surgical procedures and treatments. Many of the electronic endoscopes conventionally project white light (hereinafter referred to as ordinary light) into a test subject body for imaging the interior of the subject body by an imaging device like CCD. Recently, for the sake of acquiring such images that show the details of particular tissues or biological components of the subject body, which are not clearly perceivable from endoscopic images acquired under the ordinary light, some of the electronic endoscopes also use rays of particular narrow wavelength bands (hereinafter referred to as special light) as illumination light for the imaging.

Also, such methods for processing endoscopic images have recently been known in the art that make particular tissues conspicuous in the image by enhancing the contrast of these tissues. In an example, blood vessels in superficial mucosal layer (or superficial blood vessels) may be contrast-enhanced through an image processing procedure for enhancing those image fragments which have a particular spatial frequency within an acquired image, hereinafter referred to as frequency enhancement. Such digital image processing as the frequency enhancement is effective to improve the visibility of target tissues in combination with the endoscopic image acquired under the special light.

Generally, the endoscope is provided with a channel 28 along a probing portion that is introduced into the test subject body or patient, so that a surgical tool like forceps may be inserted through the channel 28 and protruded from a distal end of the probing portion. Thus, using the surgical tool, the operator of the endoscope may apply a surgical procedure or treatment to a target site like tumor tissues of the subject body. Since the tip of the surgical tool is protruded from the distal end of the probing portion and hence located within the view field or imaging field of the endoscope, the operator is able to operate the surgical tool to conduct the procedure while watching the images monitored by the endoscope and checking the position of the surgical tool to the target site.

The surgical tools may however cause problems when protruded into the imaging field of the endoscope. For example, some of the surgical tools may reflect the illumination light so much that the monitored endoscopic images suffer smears or flares, which will obstruct the inspection of the target site. To solve this problem, such electronic endoscopes that prevent the smears and flares by blocking the incidence of the reflected light from the surgical tool onto the imaging device have been suggested for example in JPA 2002-65586 and JPA 1991-275028.

In addition to the above problem, when endoscopic image containing the surgical tool beside the target subject is digitally processed for example for the above-mentioned frequency enhancement, if pixels corresponding to the surgical tool are processed in the same way as other pixels of the image, the image of the surgical tool may often be modified undesirably, such as being altered in color, or getting moirés or other periodic patterns, which will adversely affect the inspection of the target site. The same problem can occur when the distal end of the probing portion of the endoscope bends so sharply that the probing portion itself is pictured in the endoscopic image.

The above problem in processing endoscopic image is inevitable so long as the surgical tool is to be captured in the endoscopic image. The above method of preventing the reflected light from the surgical tool from entering the imaging device of the endoscope is not useful for solving the problem caused by the image processing.

SUMMARY OF THE INVENTION

In view of the foregoing, an object of the present invention is to avoid processing image data of an artificial object like a surgical tool when the image data of the artificial object is contained in image data as acquired by the endoscope, thereby to provide images in a desirable condition for the inspection of the target site.

In an electronic endoscope system using an electronic endoscope that can be inserted into a test subject to capture images of the interior of the test subject, the present invention comprises a changed-area detecting device, a mask data producing device, and an image processing device. The changed-area detecting device detects a changed area in an image captured by the electronic endoscope using data of the captured image, the changed area having different features from other area of the captured image. The mask data producing device produces mask data based on the detected changed area, the mask data allocating an image processing parameter to each pixel of the captured image such that the changed area is processed in a different way from the other area. The image processing device processes the captured image according to the mask data.

Preferably, the changed-area detecting device detects those pixels as changed pixels from the captured image which have changed beyond a predetermined degree, combines the changed pixels into clusters, and determines among the clusters of changed pixels such a cluster that is equal to or greater than a predetermined size to be the changed area.

In an embodiment, the changed-area detecting device may detect those pixels having levels of not less than a predetermined first threshold level as the changed pixels.

Where the captured image is a color image containing red pixels, the first threshold level may be predetermined based on pixel levels of the red pixels, especially for in-vivo inspection.

In another embodiment, the changed-area detecting device may store a basic image as a basis for detecting changes in pixels, calculate differences in individual pixels between the basic image and the captured image, and detect those pixels in which the calculated differences are not less than a second threshold level as changed pixels.

In an alternative, the changed-area detecting device may detect those pixels having levels of not less than a predetermined first threshold level as the changed pixels until a predetermined time has passed since a start of insertion of the electronic endoscope into the test subject, and after the predetermined time has passed, the changed-area detecting device may store a basic image as a basis for detecting changes in pixels, calculate differences in individual pixels between the basic image and the captured image, and detect those pixels in which the calculated differences are not less than a second threshold level as changed pixels.

The basic image may preferably be defined by average data values of previously captured images.

Alternatively, the changed-area detecting device may use a previous image frame captured before a current image frame as the basic image for detecting a changed area in the current image frame. In this embodiment, the mask data producing device may produce pre-mask data based on the changed area detected using the basic image, and store the mask data as produced for the previous image frame, to produce new mask data for the current image frame based on the pre-mask data and the mask data for the previous image frame.

The changed-area detecting device may preferably detect the changed pixels in a designated partial area of the captured image, combines the changed pixels into clusters, determine among these clusters such clusters that are equal to or greater than a predetermined size to be pre-changed areas, detect those pixels having the same color as a representative color of the pre-changed areas outside the pre-changed areas to combine with the pre-changed areas into clusters, and determine among these clusters such a cluster that is equal to or greater than the predetermined size to be the changed area.

The designated area is preferably located in a position where an artificial tool begins to enter the captured image. The designated area is preferably switchable according to the type of the electronic endoscope.

Preferably, the pixels having the same color as the representative color of the pre-changed area are to be detected and combined with the pre-changed area within a predetermined range adjacent to the designated area.

The changed-area detecting device may also preferably use a changed area detected in a previous image frame captured before a current image frame as a pre-changed area for the current image frame. Then, the changed-area detecting device may detect those pixels having the same color as a representative color of the pre-changed area outside the pre-changed area, and combine these pixels with the pre-changed area to detect a new changed area in the current image frame.

Preferably, the mask data include binary parameters for switching a particular kind of image processing ON or OFF to each pixel. The mask data may also include parameters for determining magnitude of a particular kind of image processing.

More preferably, the mask data is multi-level data for determining magnitude of a particular kind of image processing, including a parameter value to be allocated to pixels of the changed area, a parameter value to be allocated to pixels of an unchanged area, and at least a parameter value to be allocated to those pixels which have changed intermediately between the pixels of the changed area and the pixels of the unchanged area.

The image processing device may process the pixels of the changed area through a first kind of image processing, the pixels of the unchanged area through a second kind of image processing, and the intermediately-changed pixels through the first and second kinds of image processing at a variable ratio of mixture determined by the mask data.

The image processing device may also produce a first image from the captured image through a first kind of image processing and a second image from the captured image through a second kind of image processing, and synthesize the first and second images into a composite image according to the mask data.

The image processing device may preferably make at least an enhancing process for enhancing particular structures of the test subject contained in the captured image on the basis of the mask data.

An image processing method of the present invention comprises the steps of: capturing images of the interior of a test subject by an electronic endoscope inserted into the test subject; detecting a changed area in an image captured by the electronic endoscope using data of the captured image, the changed area having different features from other area of the captured image; producing mask data based on the detected changed area, the mask data allocating an image processing parameter to each pixel of the captured image such that the changed area is processed in a different way from the other area; and processing the captured image according to the mask data.

The system and the method of the present invention are effective to prevent image data of an extraneous or artificial object like a surgical tool from unnecessary image-processing like image enhancement when the artificial object is contained in the image captured by the endoscope, and execute desirable image-processing only on image data of the target subject. Thus, the present invention provides images in a desirable condition for the inspection of the target site.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein:

FIG. 8 is a flowchart illustrating a sequence of changed-area detection processes selectively using two detection modes, according to another embodiment of the present invention;

FIG. 9 is a flowchart illustrating a sequence of changed-area detection processes using a designated limited area in an image, according to a further embodiment of the present invention;

FIG. 17 is a flowchart illustrating an embodiment wherein the image processing using the mask data is executed in parallel to other kinds of image processing.

DESCRIPTION OF THE PREFERRED EMBODIMENTS

Figure 1:
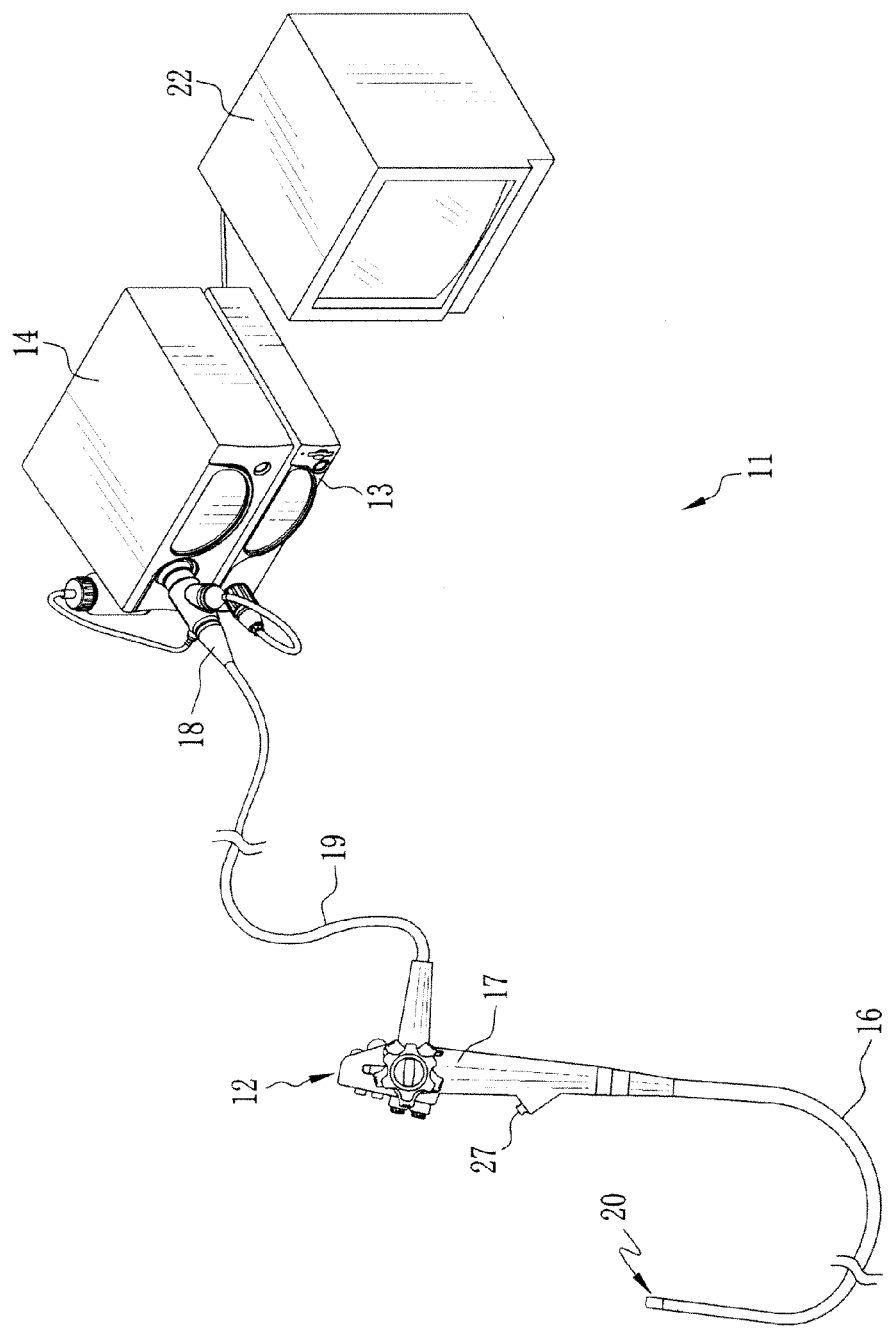
FIG. 1 is a diagram illustrating an outer appearance of an electronic endoscope system.

As shown in FIG. 1, an electronic endoscope system 11 includes an electronic endoscope 12, a processor unit 13, and a light source unit 14. The electronic endoscope 12 includes a flexible probing portion 16 to be inserted into the body cavity, a handling section 17 coupled to a proximal end of the probing portion 16, a connector 18 connected to the processor unit 13 and the light source unit 14, and an universal cord 19 connecting the handling section 17 and the connector 18. In a distal end 20 of the probing portion 16 is provided a CCD image sensor 21 (see FIG. 2) for imaging the interior of the body cavity.

The processor unit 13 is electrically coupled to the light source unit 14, and supervises the overall operation of the electronic endoscope system 11. Through a cable that is conducted through inside the universal cord 19 and the probing portion 16, the processor unit 13 controls power supply to the electronic endoscope 12 and also controls driving the CCD 21. The processor unit 13 receives image signals from the CCD 21 through the cable, and process the image signals to produce image data. Based on the image data produced from the processor unit 13, images captured by the electronic endoscope 12 may be displayed on a monitor 22 that is connected to the processor unit 13 through a cable.

Figure 2:
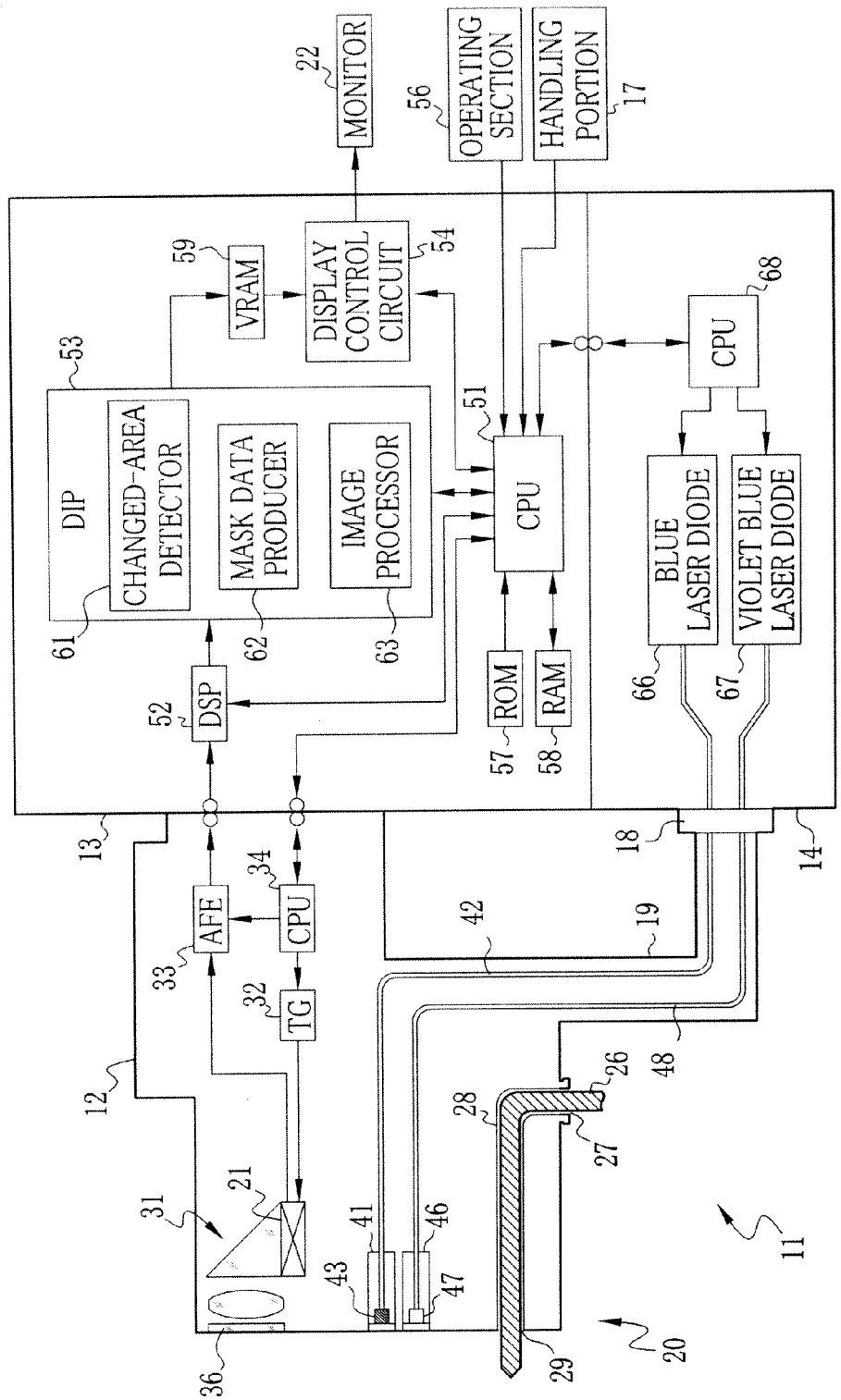
FIG. 2 is a block diagram illustrating the electric structure of the electronic endoscope system.

The handling section 17 includes an angle knob for curving the probing portion 16 to orient the distal end 20 in any appropriate direction. The handling portion 17 includes other operation members such as an air-jet button for blowing air from the distal end 20, an insufflating and watering button for ejecting air or water from the distal end 20, a release button for recording an observed image as a still image frame, a zooming button for changing the magnification of the images displayed on the monitor 22, and a switching button for switching between an ordinary inspection mode using the ordinary illumination light and a special inspection mode using special illumination light. A tool inlet 27 is provided in a distal part of the handling section 17, allowing insertion of a surgical tool, such as an electric scalpel, into a tool channel 28 inside the probing portion 16, as shown in FIG. 2. The tool inlet 27 is connected through the channel 28 to a tool outlet 29 that is provided in the distal end 20.

As shown in FIG. 2, an objective lens system 31, the CCD 21, light projecting units 41 and 46 are mounted in the distal end 20 of the endoscope 12. On the other hand, a timing generator (TG) 32, an analog signal processing circuit or analog front end circuit (AFE) 33 and CPU 34 are provided in the handling section 17 or in the connector 18 of the universal cord 19.

The objective lens system 31 includes lens groups and a prism, which are configured to form an optical image on the CCD 21 from light entering through an inspection window 36.

The CCD 21 has an imaging surface having a lot of sensor pixels that accumulate electronic charges at different levels corresponding to the amounts of light incident on the respective pixels. Thus the CCD 21 converts an optical image of the interior of the subject body, which is formed on the imaging surface of the CCD 21 through the objective lens system 31, into an electronic image signal. A color filter consisting of multiple color segments is formed on the sensor pixels. The color filter may for example be a primary color filter (RGB filter) having the color segments arranged in the Beyer layout.

The TG 32 supplies the CCD 21 with a clock signal. The image sensor 21 conducts imaging and outputs the image signal in accordance with the clock signal from the TG 32. The CPU 34 controls the clock signals output from the TG 32.

The AFE 33 consists of a correlated double sampling circuit (CDS), an automatic gain control circuit (AGC), and an analog-to-digital converter (A/D), which are not shown in the drawings though. The AFE reduces noises from the analog image signal from the CCD 21, corrects gains of the image signal, and then converts the image signal to a digital signal. The CDS processes the image signal from the CCD 21 through correlated double sampling, to eliminate noises that may be caused by driving the CCD 21. The AGC amplifies the image signal after the noise reduction through the CDS. The AID converts the amplified image signal to a digital image signal of a predetermined bit number, and transfers the digital image signal to the processor unit 13. The AFE 33 is controlled by the CPU 34. For example, the CPU 34 controls the amplification rate (gain) of the image signal through the AGC on the basis of an operational signal from the CPU 51 of the processor unit 13.

The light projection units 41 and 46 are configured to project ordinary illumination light and special illumination light into the subject body, respectively.

The light projection unit 41 is provided with a phosphor 43, and is supplied with blue laser light from the light source unit 14 through a light guide 42. The phosphors 43 may for example be a YAG phosphor or BAM ($BaMgAl_{10}O_{17}$) phosphor that is excited to emit green to yellow fluorescence as it absorbs part of the blue laser light. The green to yellow fluorescence from the excited phosphor 43 is mixed with remaining part of the blue laser light that passes through the phosphor 43 without being absorbed, to produce the white or pseudo-white ordinary light. Since the blue laser light is diffused as it is transmitted through the phosphor 43, the ordinary light as projected from the light projection unit 41 uniformly illuminates the view field or imaging field of the endoscope 12.

The light projection unit 46 is provided with a light diffuser 47, and is supplied with violet blue laser light from the light source unit 14 through a light guide 48. The light diffuser 47 transmits the violet blue laser light while diffusing it. As a result, the light projection unit 46 projects the diffused violet blue laser light as the special illumination light into the subject body. Thus the special light from the light projection unit 46 uniformly illuminates the view filed of the endoscope 12.

The processor unit 13 includes the CPU 51, a digital signal processing circuit (DSP) 52, a digital image processing circuit (DIP) 53, a display control circuit 54, and an operating section 56.

The CPU 51 is connected to respective components through a not-shown data-bus or address-bus or control line, to control the overall operation of the processor unit 13 in a comprehensive manner. ROM 57 stores various programs and data for controlling the operation of the processor unit 13, such as OS, applications and graphic data. The CPU 51 reads out the program and data as needed from the ROM 57, develops the read program and data on a work memory or RAM 58 as to execute the program sequentially. The CPU 51 also obtains variable information about each individual examination, including the data of examination, the subject or patient to be examined, and the doctor or operator in charge of the endoscopic procedure, from the operating section 56 or through a network such as a local area network (LAN), and stores the obtained information in the RAM 58.

The DSP 52 processes the image signal received from the AFE 33, for color-separation, color-interpolation, gain correction, white-balance control, gamma correction, and other various signal processing to produce image data. The image data from the DSP 52 is written in a work memory of the DIP 53. The DSP 52 also produces data for automatic light control (ALC) that is necessary for automatically controlling the volume of the illumination light, and supplies the ALC data to the CPU 51. The ALC data may for example be an average luminance value of all pixels of the produced image.

The DIP 53 is processing the image data from the DSP 52 for electronic zooming, enhancement, and other various kinds of image processing. The DIP 53 includes a changed-area detector 61, a mask data producer 62 and an image processor 63. The image data processed by the DIP 53 is stored temporarily in the VRAM 59, and is fed to the display control circuit 54 to display endoscopic images visualizing the interior of the subject body, hereinafter referred to as the inspection images.

The changed-area detector 61 detects such an area of an image frame that has changed in feature from the same area of another image frame among those image frames which are successively fed to the changed-area detector 61. The area detected by the changed-area detector 61 will be called the changed area hereinafter. In the present embodiment, the changed area must include at least a predetermined number of pixels. That is, the changed-area detector 61 will not detect such an area that consists of fewer pixels than the predetermined number, regardless of the change in feature. The changed-area detector 61 gives information about the changed area to the mask data producer 62.

Corresponding to the received data of the changed area, the mask data producer 62 produces mask data. The mask data are parameters assigned to individual pixels of each image frame, determining whether a particular kind of image processing should be executed on the assigned pixel or not, or how much degree the image processing should be executed on the pixels. The image processor 63 uses the mask data when executing the particular image processing on the image data. For example, the mask data serve to exclude pixels of the changed area, as detected by the changed-area detector 61, from the particular image processing.

The image processor 63 executes various kinds of image processing on the input image data, for electronic zooming, image enhancement, etc. For example, the image processor 63 executes frequency enhancement on the image data. Because superficial blood vessels are fine and dense, they have high spatial frequencies. As the frequency enhancement boosts up pixel levels of those components which have higher spatial frequencies, and thus enhances the contrast, the contrast of superficial blood vessels will be enhanced in the inspection image after being subjected to the frequency enhancement. As described in detail later, the image processor 63 uses mask data at least on executing the frequency enhancement. In an embodiment, the mask data is used for applying the frequency enhancement only to those image areas which are not included in the changed area.

The display control circuit 54 gets the image data of endoscopic image from the VRAM 59 and also receives graphic data from the CPU 51. The graphic data is read out from the ROM 57 and the RAM 58, and includes framing data for displaying only an effective image area while masking out ineffective image areas, text data representative of the examination date and time, the patient's name and the operator's name, data for graphical user interface (GUI), etc. The display control circuit 54 superimposes the graphic data onto the image data, and then converts the image data into a video signal of a compatible format to the display format of the monitor 22, e.g. a component signal or a composite signal. The video signal is output to the monitor 22. Thus, the inspection image is displayed on the monitor 22.

The operating section 56 may consist of well-known input devices such as an operation panel mounted on a housing of the processor 13, a mouse, and a keyboard. The CPU 51 operates the respective components of the electronic endoscope system 11 according to operational signals from the operating section 56 as well as those from the handling section 17 of the endoscope 12.

Beside the above components, the processor unit 13 is provided with a data compressing circuit for compressing the image into data of a predetermined format, e.g. JPEG format, a media interface for recording the compressed image on removable media, and a network interface for controlling data transmission over a network such as LAN. These components are connected to the CPU 51 via a data bus or the like.

The light source unit 14 includes a blue laser diode (LD) 66 and a violet blue laser diode (LD) 67 as light sources. The blue LD 66 emits blue laser light having a center wavelength of 445 nm. The blue laser light from the blue LD 66 is conducted through the connector 18 and the light guide 42 to the light projecting unit 41, where the blue laser light enters the phosphor 43 to produce the pseudo-white light, which is projected as the ordinary illumination light into the subject body.

The violet blue LD 67 emits violet blue laser light having a center wavelength of 405 nm. The violet blue laser light is conducted through the connector 18 and the light guide 48 to the light projecting unit 46, and is projected as the special light into the subject body.

A CPU 68 controls the timing and volume of emission from these light sources 66 and 67. The CPU 68 automatically controls the volume of light from the blue LD 66 and the violet blue LD 67 to be optimum in a real time fashion based on the ALC data that is transmitted from the CPU 51 of the processor unit 13 to the CPU 68.

The CPU 68 turns only the blue LD 66 on to project only the ordinary light for illumination in the ordinary inspection mode. In the special inspection mode, the CPU 68 turns both the blue LD 66 and the violet blue LD 67 on to project the ordinary light and the special light simultaneously for illumination. The CPU 68 may control the light volume of the blue LD 66 and the violet blue LD 67 independently from each other. Accordingly, the CPU 68 may adjust the light volume of the ordinary or white light or the special or violet blue light as the components of the illumination light in the special inspection mode. The images acquired in the special inspection mode will show superficial blood vessels more clearly than the images acquired in the ordinary inspection mode.

Figure 3:
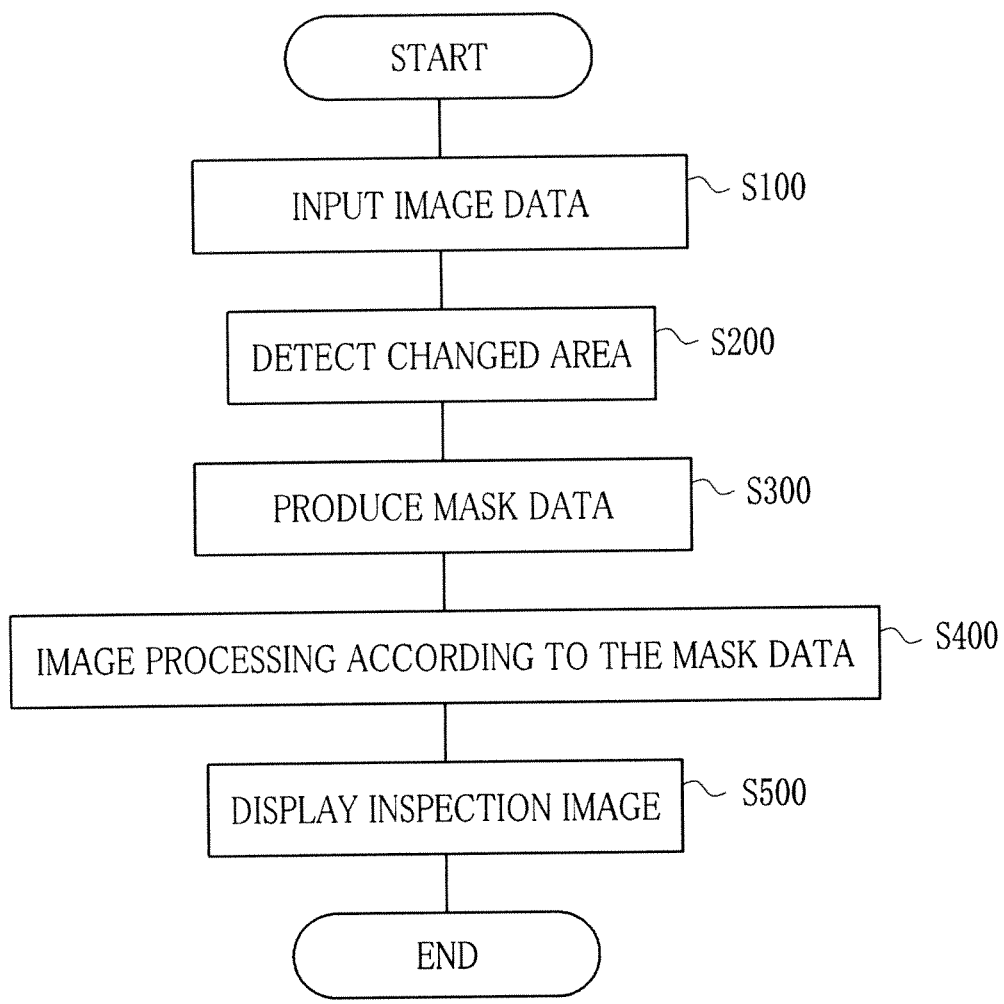
FIG. 3 is a flowchart illustrating a sequence of image processing according to the present invention.
Figure 4:
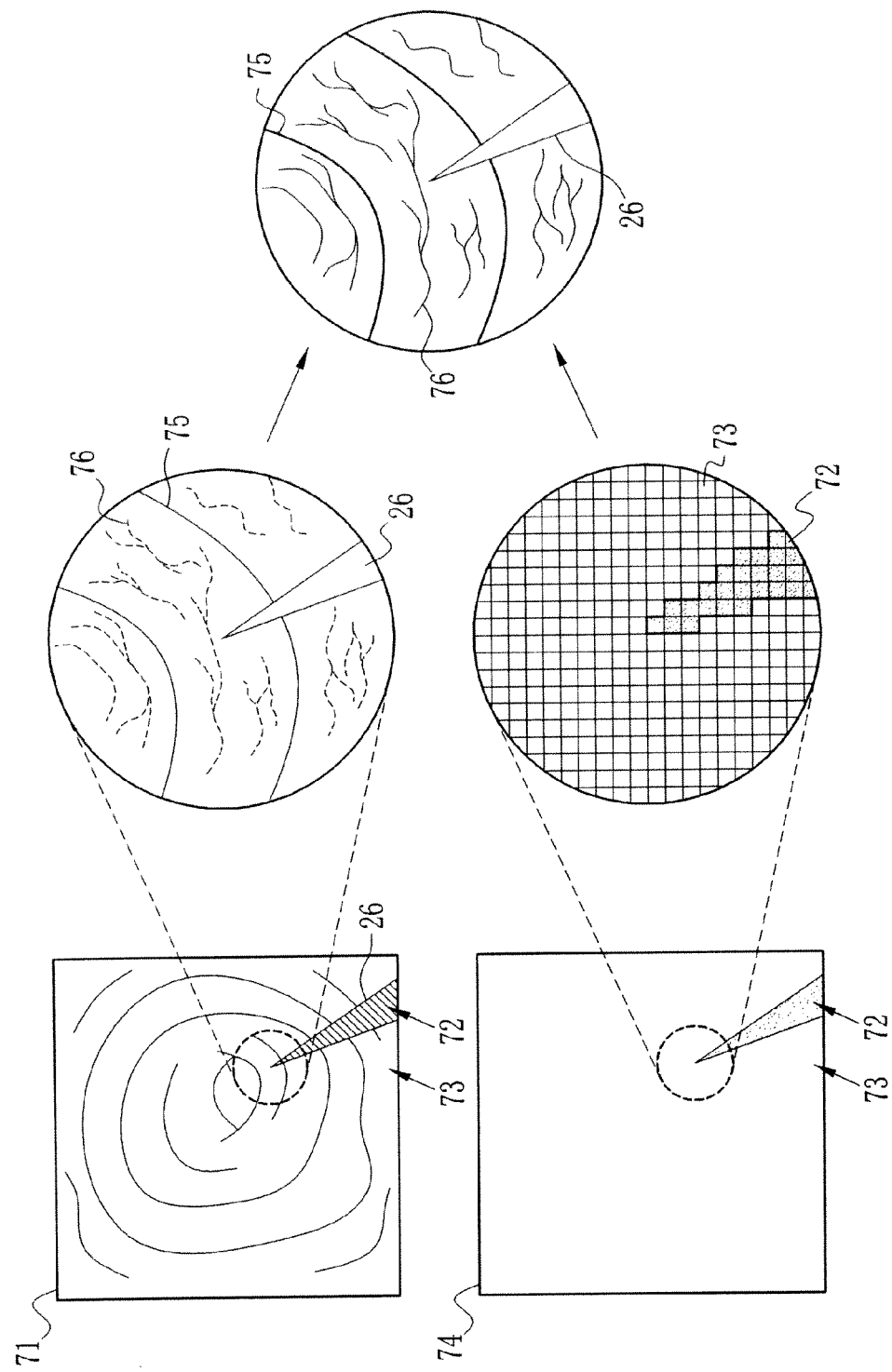
FIG. 4 is an explanatory diagram illustrating the image processing sequence according to the present invention.

The electronic endoscope system 11 having the above-described configuration carries out image-processing in a way as illustrated in FIGS. 3 and 4, to produce endoscopic image to be displayed on the monitor 22.

When the electronic endoscope system 11 is activated and the probing portion 16 is introduced into the subject body, images of the interior of the subject body are captured by the CCD 21. As a tool 26 is inserted through the tool inlet 27 and the tip of the surgical tool 26 is protruded out of the tool outlet 29 at the distal end 20 of the probing portion 16, the tip of the tool 26 comes in the imaging field of the endoscope 12. The operator can switch over between the ordinary inspection mode and the special inspection mode at appropriate timing. The following example will be described with regard to the special inspection mode.

The image signal output from the CCD 21 is fed through the AFE 33 to the DSP 52, where the image signal is processed to be a digital image 71. Data of the image 71 is transferred frame after frame to the DIP 53 (step S100)

In the DIP 53, the changed-area detector 61 detects the changed area 72 in the image 71 (step S200). The changed-area detector 61 checks the data of the image 71 frame by frame as they are transferred sequentially from the DSP 52, to detect changes in pixel levels of respective pixels of the image 71, which may be resulted from changed relative position of the distal end 20 to the subject body, changed illumination light volume, the inserted tool 26, etc. The changed-area detector 61 determines those areas to be the changed areas 72 where the pixel levels vary over a certain degree.

Among these causes for the change in pixel level, the change in relative position of the distal end 20 to the subject body, caused by moving the distal end 20 or changing the imaging angle or direction of the distal end 20, will provide image frames picturing different portions of the subject body, but pixel levels of successive ones of these image frames are similar to one another. Therefore, the changed-area detector 61 does not detect any changed area 72 in those cases. Because the illumination light volume will change slowly as compared to the interval of imaging by the CCD 21, and the change in light volume merely causes a change in luminance between the image frames, the change will be so small that the changed-area detector 61 will not detect any changed area 72 either in this case.

On the other hand, when the tool 26 is inserted into the subject body, the captured image will have a portion that showed a fragment of the subject body before but is showing the tip of the tool 26. In such a portion, pixel levels will remarkably change. Moreover, the insertion of the tool 26 will cause the change in pixel level of the image 71 in a united area. Therefore, the area corresponding to the tool 26 may be detected as a changed area 72.

After detecting the changed area 72, the changed-area detector 61 sections the image 71 into the changed area 72 and an unchanged area or areas 73 where image features have barely changed. The unchanged area 73 corresponds to an image portion showing the subject body.

Thereafter, the DIP 53 produces the mask data 74 in the mask data producer 62 (step S300). In the present embodiment, the mask data 74 are matrix data for deciding whether a particular kind of image processing should be applied to each individual pixel of the image 71. Specifically, the mask data 74 assigns a parameter "0" to each pixel of the changed area 72, instructing not to execute the image processing on this pixel, and assigns a parameter "1" to each pixel of the unchanged area 73, instructing to execute the image processing on this pixel.

After producing the mask data 74, the DIP 53 processes the image 71 in the image processor 63. For example, while the image processor 63 is making the frequency enhancement in the special inspection mode, the image processor 63 refers to the mask data 74 to choose the pixels between those to be processed and those not to be processed (step S400). Accordingly, the image portion corresponding to the tool 26, detected as the changed area 72, remains unprocessed, while other image portions, i.e. pixels in the unchanged area 73, are processed for frequency enhancement.

After going through the above-described processes in the DIP 53, the image data is temporarily stored in the VRAM 59 and then displayed as an endoscopic image on the monitor 22 (step S500). Because being edge-enhanced through the frequency enhancement, internal macro structures 75 of the subject body are enhanced, or superficial blood vessels 76, which are difficult to identify due to their low contrast in the captured image 71, get clearly perceivable in the processed image. On the other hand, since the image portion detected as the changed area 72 is not subjected to the image processing, including the frequency enhancement, the image of the tool 26 is displayed in the same condition as in the original, without being changed in color or shape or having undesirable patterns.

Figure 5A:
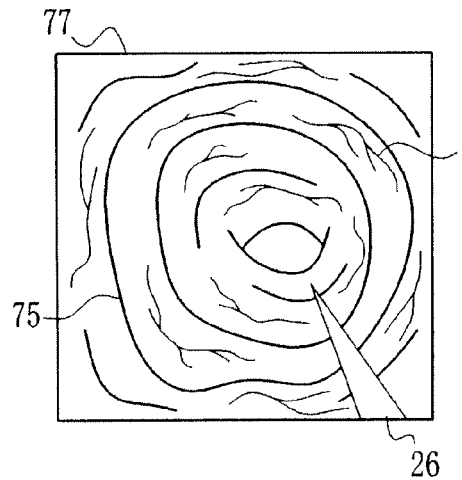
FIGS. 5A and 5B are explanatory diagrams illustrating the difference between an image processed with mask data and an image processed without the mask data.
Figure 5B:
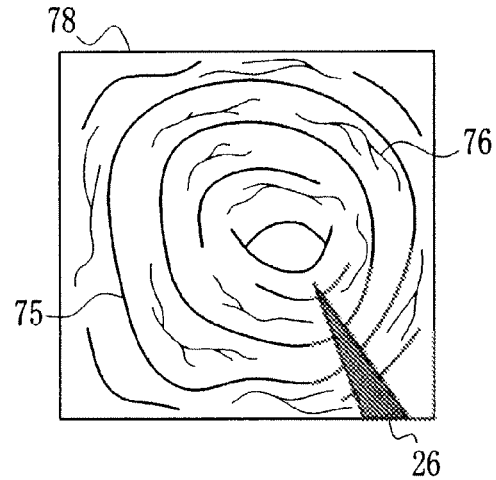

Referring to FIGS. 5A and 5B, an image 77 after the frequency enhancement using the mask data 74 and an image 78 after frequency enhancement without the mask data 74 are illustrated respectively. In these images 77 and 78, the internal structures 75 of the subject body and the superficial blood vessels 76 are edge-enhanced in the same way. As for the tool 26, it keeps such a color that does not disturb the inspection of the subject body, e.g. the original color of the tool 26 in the image 77 processed using the mask data 74. On the other hand, in the image 78 processed without using the mask data 74, the tool 26 and its periphery may be colored so undesirably that they disturb the inspection.

As described so far, the electronic endoscope system 11 according to the present embodiment detects the changed area 72 that corresponds to the tool 26 within the image 71, and produces the mask data 74 as parameters for deciding with respect to each pixel whether to subject it to a certain kind of image processing or not. Based on the mask data 74, pixels in the changed area 72 are not subjected to the image processing, but the image processing is executed on those pixels which belong to the unchanged area 73 that shows the interior of the subject body.

It should be noted that the method of detecting the changed area 72 is not limited to the above embodiment, but the changed area 72 may be detected in any appropriate way. Another example of how to detect the changed area 72 will be described in the following second embodiment, which may have substantially the same features as the above first embodiment except the way of detecting the changed area 72. Therefore, the following description will relate merely to essential features to the second embodiment.

Figure 6:
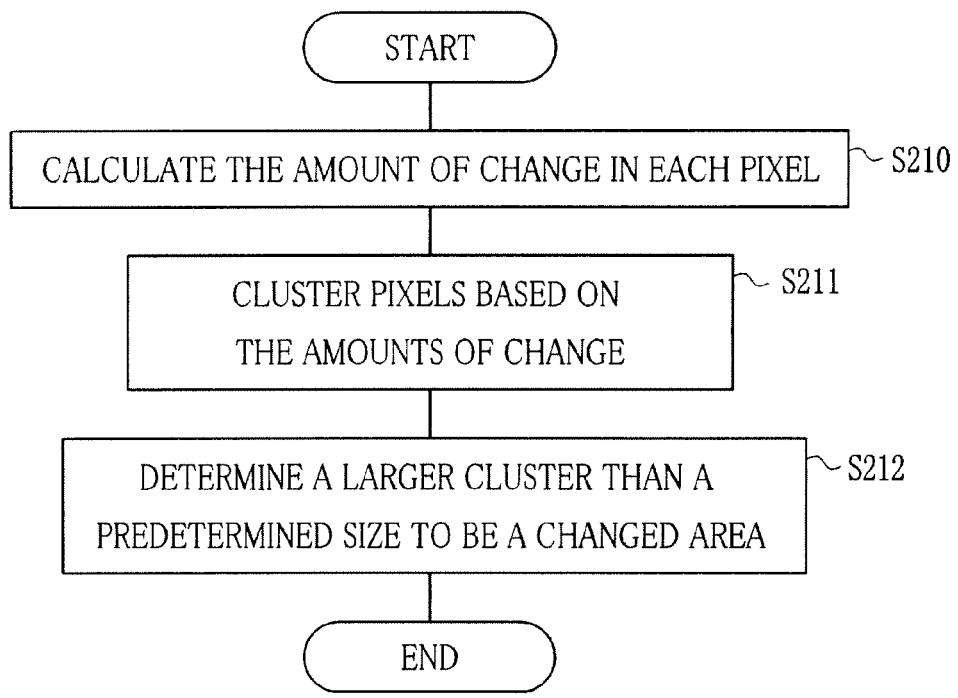
FIG. 6 is a flowchart illustrating a sequence of changed-area detection processes according to an embodiment of the present invention.

As shown in FIG. 6, the changed-area detector 61 monitors the pixel level of each individual pixel of the input image 71, and calculates an amount of change in the pixel level of each pixel (step S210), in order to detect those pixels whose pixel levels have changed by more than a predetermined degree, hereinafter referred to as the changed pixels (designated by 81, 81a to 81c in FIG. 7B).

The changed pixels may for example be detected in the following manner. First, the changed-area detector 61 compares each pixel level of the individual pixel of the input image 71 with a predetermined threshold level, hereinafter referred to as the first threshold level, to determine whether each pixel level is above or below the first threshold level. Thus, the changed-area detector 61 detects those pixels whose pixel levels are not less than the first threshold level as changed pixels. The first threshold level may for example be an average level of red pixels. As the captured image data generally represent internal organs of a living body, the average red pixel level is approximately constant. Therefore, adopting the average red pixel level as the first threshold level is effective to detect those pixels which correspond to artificial objects like the surgical tool 26.

Alternatively, the changed pixels may also be detected as follows: average image data of previously captured image frames is stored as a basis for checking pixel level variations, hereinafter referred to as a basic image; pixel levels of the basic image are subtracting from corresponding pixels of a newly input image frame, and the differential pixel levels obtained by this subtraction are compared with another predetermined threshold level, hereinafter referred to as the second threshold level. Thus, among the pixels of the newly input image frame, those pixels which differ from the corresponding pixels of the basic image to such degrees that reach or exceed the second threshold level, are detected as the changed pixels.

After detecting the changed pixels, the changed-area detector 61 makes a clustering process based on the detected changed pixels (step S211), and determine such clusters that are equal to or greater than a predetermined size (containing a predetermined number of pixels) as the changed areas 72 (step S212).

Figure 7A:
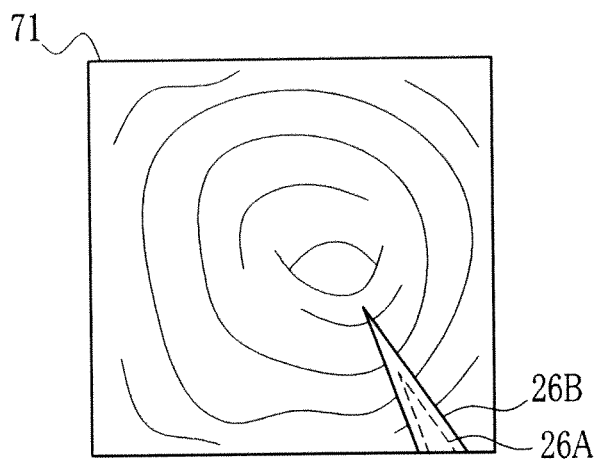
FIGS. 7A to 7C are explanatory diagrams illustrating the changed-area detection processes.
Figure 7B:
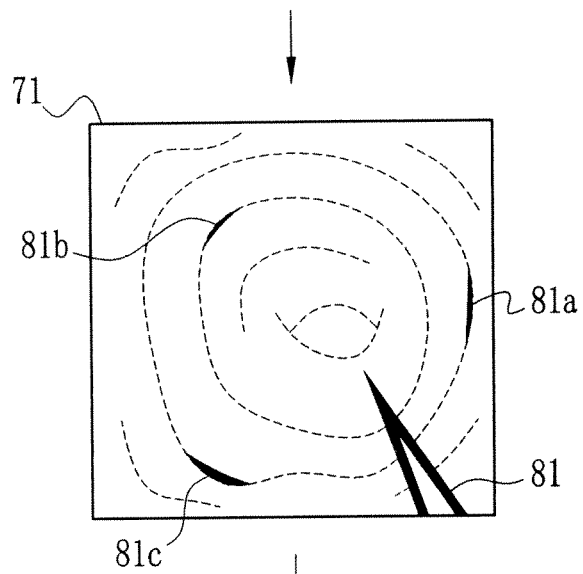

As shown for example in FIG. 7A, when the tip of the tool 26 is protruded into the imaging field of the endoscope 12, successive two frames of the image 71 will contain the tip of the tool 26 at slightly different positions as designated by 26A and 26B. Then, the changed-area detector 61 will detect those pixels which exist between the former position 26A and the current position 26B of the tip of the tool 26 as the changed pixels 81, as shown in FIG. 7B. In this stage, the changed-area detector 61 may detect changed pixels 81a to 81c in other parts of the image because of some movement of the subject body itself or the distal end 20 of the endoscope 12. However, the changed-area detector 61 does not count every detected changed pixel in the changed area 72.

Figure 7C:
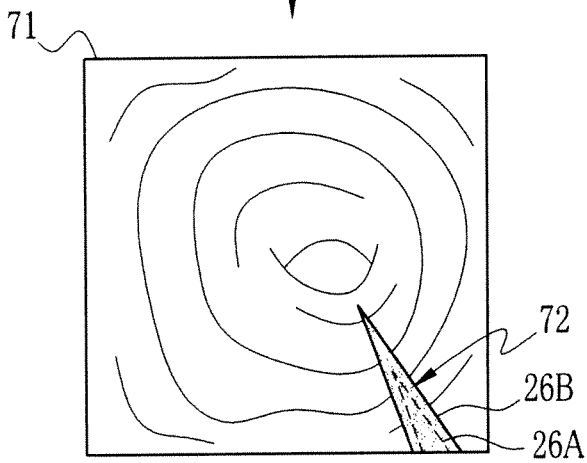

After detecting the changed pixels 81, 81a to 81c, the changed-area detector 61 carries out a clustering process, whereby a cluster of pixels outlined with the changed pixels 81 and a margin of the image 71, and clusters of the changed pixels 81a to 81c are identified in the illustrated example. Then, the changed-area detector 61 determines only such a cluster that attains or exceeds the predetermined size as the changed area 72. Thus, the cluster defined by the changed pixels 81, which are resulted from the insertion of the tool 26, is identified as the changed area 72, as shown in FIG. 7C.

On the other hand, because the movement of the endoscope 12 is usually limited to a small range while the tool 26 is being operated, the clusters of the changed pixels 81a to 81c, which are resulted from the movement of the endoscope 12 inside the subject body, are smaller than the predetermined size. Therefore, other image areas including the changed pixels 81a to 81c are identified as the unchanged areas 73. Thus, only those pixels which correspond to the tool 26 are detected as the changed area 72.

In the above-described embodiment, average image data of previously captured image frames is held as a basic image for comparison with a new image frame to detect the changed area 72. However, the basic image is not limited to the average image frame. For example, the preceding image frame to a new image frame may serve for the basic image. In that case, the mask data 74 should preferably be produced in the way as set forth below.

First, the changed-area detector 61 detects the changed area 72 of a newly captured image frame in comparison with the preceding image frame as the basic image, otherwise in the same way as in the above-described embodiment. Next, the mask data producer 62 produces pre-mask data based on the detected changed area 72, the pre-mask data being such mask data that simply correspond to the detected changed area 72. However, because being detected using the preceding image frame as the basic image, this changed area 72 may not exactly correspond to the tool 26, especially when the tool 26 is rapidly moved into and out of the imaging field of the endoscope 12. As a result, the image area masked by the pre-mask data, i.e. excluded from the image processing, may deviate from the image area that actually represents the tool 26.

In order to avoid this problem, the mask data producer 62 holds mask data 74 that was used for the preceding image frame (hereinafter referred to as former mask data), and produces new mask data 74 for the newly captured image frame on the basis of the pre-mask data and the former mask data. Specifically, the mask data producer 62 compares the pre-mask data with the former mask data, and inverts data values of the former mask data in those pixels which correspond to the changed area 72 in the pre-mask data, thereby to produce the new mask data 74, wherein inverting the data value means replacing the parameter "0" with "1", and vice versa.

The new mask data 74 produced in the way as described above will match more exactly with the tool 26, even in the case where the preceding image frame is used as the basic image. Particularly while the tool 26 is being little moved or while the tool 26 is being retracted from the imaging field.

In the above embodiments, the changed pixels 81 (including 81a to 81c) are detected by comparing individual pixel levels of the new image frame with the first threshold level, or by comparing differential pixel levels of the new image frame from the basic image with the second threshold level. Either method is preferably applicable to the changed-area detection process. Moreover, the changed pixels 81 may be detected using any other appropriate method. However, it is more preferable to use the above two methods for detecting the changed pixels 81 selectively according to the situations, as described hereinafter with reference to FIG. 8.

In an embodiment of FIG. 8, the changed-area detector 61 switches the detection mode for the changed pixels 81 depending upon whether a predetermined time has elapsed since the insertion of the probing portion 16 of the endoscope 12 into the subject body (step S220). Within the predetermined time from the start of insertion of the probing portion 16, pixel levels of each image frame are compared with the first threshold value to detect the changed pixels 81 (step S221). After the predetermined time, each image frame are compared with the basic image to detect differential pixel levels, and the differential pixel levels are compared with the second threshold value to detect the changed pixels 81 (step S222).

After detecting the changed pixels 81, the changed-area detector 61 takes the same steps S211 and S212 as in the above embodiments, to detect the changed area 72 in the image on the basis of the changed pixels 81.

While the probing portion 16 is being introduced into the subject body, the difference between successive image frames captured by the endoscope 12 can be so large that the changed-area detector 61 may detect such a large cluster of changed pixels through the comparison with the basic image, that will be determined as a changed area, even though the tool 26 does not protrude into the imaging field of the endoscope 12. On the other hand, once the distal end 20 of the probing portion 16 has reached the target site in a certain time from the start of insertion of the probing portion 16, the difference between the successive frames get less. Thereafter, the changed-area detector 61 can accurately detect the changed area 72 corresponding to the inserted tool 26 on the basis of those changed pixels 81 which are determined through the comparison with the basic image.

The lapse of time from the start of insertion of the probing portion 16 maybe counted in any appropriate manner. For example, the operator may set the processor unit 13 to start counting the time with the start of insertion of the tool 26. The operator may also switch between the two kinds of detection modes for the changed pixels 81 at any appropriate time, for example, by operating the processor unit 13, although the switching between these modes is made automatically according to the lapse of time from the insertion of the probing portion 16 in the above embodiment.

In an alternative, the switching between the above two detection modes for the changed pixels 81 may be done according to the lapse of time from the start of insertion of the tool 26, instead of the probing portion 16. In that case, within a predetermined time from the start of insertion of the tool 26 into the tool inlet 27, the comparison with the first threshold level is applied for detecting the changed pixels 81. When the predetermined time is over, the detection of the changed pixels 81 is switched to the mode where the image data is compared with the basic image and the second threshold level. While the tool 26 is coming into the imaging field of the endoscope 12, the difference between captured image frames is so large that the changed-area detector 61 will more accurately detect those changed pixels 81 which correspond to the inserted tool 26, using the comparison with the first threshold level. On the other hand, once the tool 26 has reached the target site, the difference between the captured image frames will be caused mainly by the movement of the tool 26. Therefore, the changed-area detector 61 can more precisely detect the changed pixels 81 corresponding to the inserted tool 26 through the comparison with the basic image.

In the embodiment where the detection modes for the changed pixels 81 are switched over according to the time from the insertion of the tool 26, it may also be preferable to provide a tool detection sensor at the tool inlet 27 or the tool outlet 29 so as to start counting the time from the insertion of the tool 26 or to activate the changed-area detector 61 and the mask data producer 62 upon the tool 26 being detected by the sensor.

In the above embodiments, the changed area 72 is detected from the whole image 71. The present invention is not limited to this configuration. For example, as will be described below with reference to FIGS. 9 and 10, the changed pixels 81 may be detected from a partial area of the image 71, to determine the changed area 72 based on these changed pixels 81.

Figure 10A:
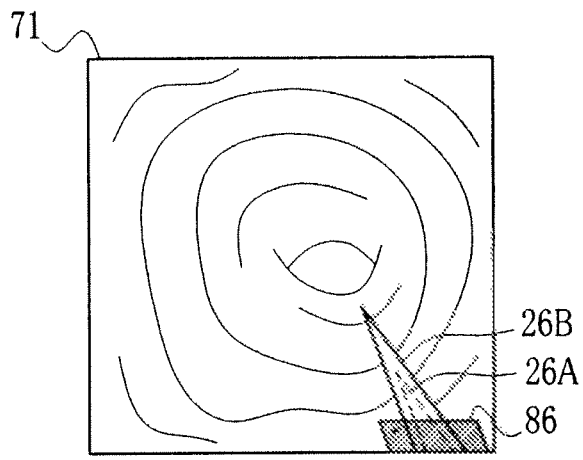
FIGS. 10A to 10C are explanatory diagrams illustrating the changed-area detection processes according to the embodiment of FIG. 9.
Figure 10B:
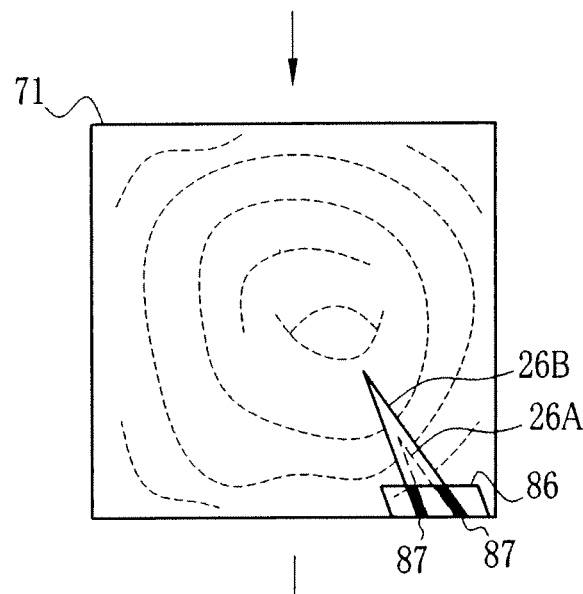
Figure 10C:
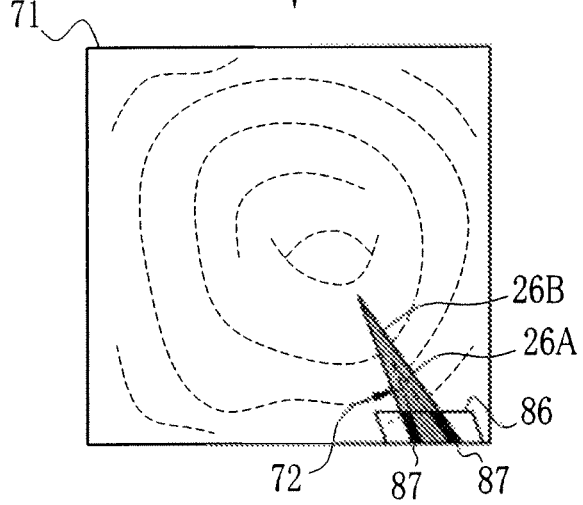

As shown in FIG. 10, a fraction 86 of the image 71 is designated as an area where the changed pixels 81 are to be detected, which will be referred to as the designated area 86. The designated area 86 is located at an entrance zone where the tool 26 will come into the imaging field of the endoscope 12 and hence appear in the captured image 71. Accordingly, the changed-area detector 61 detects the changed pixels 81 by calculating the amount of change in pixel level for each pixel of the designated area 86 (step S231). Note that the entrance zone of the tool 26 can be determined by the relative position of the tool outlet 29 to the view field or imaging field of the endoscope 12, the relative position being known as the matter of design of the endoscope 12.

The changed-area detector 61 makes the clustering process like the above embodiment, but with respect to the changed pixels 81 as detected in the designated area 86 (step S232), to determine such a cluster of changed pixels that attains or exceeds a predetermined size as a pre-changed area 87 (step S233). Since the pre-changed area 87 is determined by the clustering of the changed pixels 81 inside the designated area 86, the pre-changed area 87 constitutes a fraction of a changed area 72, and serves as a core area for determining the entire changed area 72. That is, the entire changed area 72 is determined on the basis of the pre-changed area 87 in the following manner.

After determining the pre-changed area 87 in the designated area 86, the changed-area detector 61 extract a representative color of pixels of the pre-changed area 87 (step S234). Then, the changed-area detector 61 detects those pixels having the same color as the representative color of the pre-changed area 87 in a range extending from the pre-changed area 87, and the changed-area detector 61 combines the pixels of the representative color with the pre-changed area 87 into a united cluster (step S235). If this cluster is equal to or greater than a predetermined size, the changed-area detector 61 determines the entire area of the cluster as the changed area 72 (step S236).

For instance, while the tip of the tool 26 is protruding into the imaging field, as implied by 26A and 26B in FIG. 10A, the changed-area detector 61 will detect those pixels which exist between the former position 26A and the current position 26B of the tip of the tool 26 as the changed pixels 81, but only within the designated area 86. Thus, pre-changed areas 87 are determined in the designated area 86, as shown in FIG. 10B. Thereafter, the representative color of the pre-changed areas 87 is extracted, and pixels of the representative color are detected in the range extending from the pre-changed areas 87. Then the pixels of the representative color are united with the pre-changed areas 87 into an expanded cluster. Thus, the changed-area detector 61 detects the cluster of pixels that approximately coincides with the tip of the tool 26 in the current position 26B, and determines it as the changed area 72.

According to the just described method, wherein the changed pixels 81 are detected and clustered within the designated area 86 to determine the cluster of the changed pixels 81 as the pre-changed area 87 and the whole changed area 72 is determined using the pre-changed area 87 as the core area, less data volume is necessary for calculation to determine the changed area 72 as compared to the case using all pixels of the image 71 for the changed-area detection. Thus, the changed-area detector 61 can detect the changed area 72 more efficiently and quickly.

Although the designated area 86 is located in the lower right position in the embodiment shown in FIG. 10, the designated area 86 should not be limited to this position. As described above, since the entrance zone of the tool 26 into the image 71 is previously known as it is determined by the relative position of the tool outlet 29 to the imaging field of the endoscope 12, the designated area 86 may preferably be determined according to the individual design of the endoscope 12 used in the system 11.

Figures 11A, 11B:
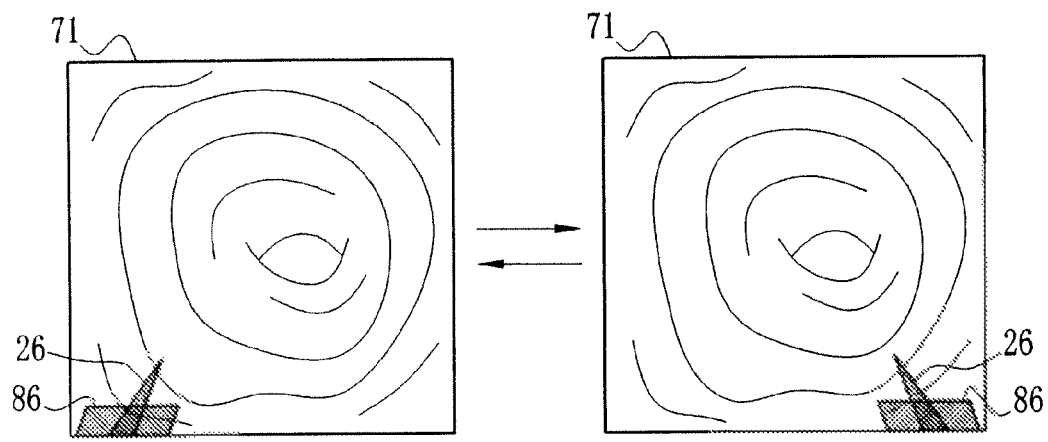
FIGS. 11A and 11B are explanatory diagrams illustrating an embodiment wherein the designated area for detection is relocatable according the design of the used endoscope.

For example, when the system 11 adopts such an endoscope hat the inserted tool 26 enters the imaging field from a lower left position, as shown in FIG. 11A, a lower left fraction of the image 71 is designated to be the area 86 for the changed-pixel detection. On the other hand, when the system 11 adopts such an endoscope 12 that the inserted tool 26 enters the imaging field from a lower right position, as shown in FIG. 11B, the designated area 86 should be changed to a lower left fraction of the image 71.

Therefore, it is preferable to configure the system 11 to be able to relocate the designated area 86 according to the type or design of the adopted endoscope 12. The designated area 86 maybe relocated manually by operating the processor unit 13. In a preferable embodiment, the processor unit 13 automatically acquires information about the type of the endoscope 12 as it is connected to the processor unit 13, to locate the designated area 86 automatically in an appropriate position according to the type of the endoscope 12. For this purpose, the endoscope 12 may preferably be mounted with a memory like EEPROM that stores information about its machine type or the like. Also, the processor unit 13 may preferably be registered with data of various locations of the designated area 86 that are adapted to the respective types of endoscopes 12.

Figure 12:
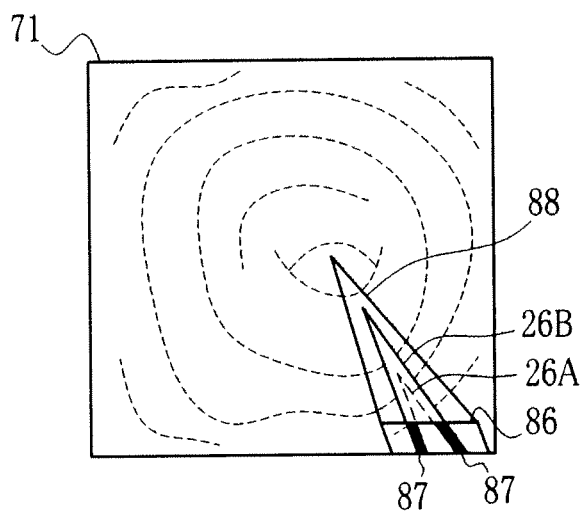
FIG. 12 is an explanatory diagram illustrating another embodiment wherein changed-area detection processes are executed within a representative color combining area in an image.

In the embodiment where the pre-changed area 87 is detected in the designated area 86 and those pixels having the same color as the representative color of the pre-changed area 87 are detected and combined with the pre-changed area 87 to determine the changed area 72, the range of detecting and combining the pixels of the representative color is not specified in connection to FIG. 10. However, it is preferable to predetermine the range within which the pixels of the representative color should be detected and combined with the pre-changed area 87. For example, as shown in FIG. 12, an area 88 adjacent to or extending from the designated area 86 may be predetermined as a representative color combining range 88, so that the clustering of those pixels having the same color as the representative color of the pre-changed area 87 will be carried out only in the representative color combining range 88 and the designated area 86. Also the location of the representative color combining range 88 should be adjusted according to the entrance zone of the tool 26. Therefore, the processor unit 13 may preferably be registered with location data of the representative color combining range 88 in combination with the location data of the designated area 86.

As the tip of the tool 26 protrudes farther from the tool outlet 29 and hence deeper into the imaging field, the tip will be reduced in size within the image 71. Therefore, a tapered area extending from the designated area 86 may preferably be designated to be the representative color combining range 88. Predetermining the representative color combining range 88 in detecting the changed area 72 based on the pre-changed area 87 will prevent such an error that the changed-area detector 61 extracts those pixels which have the same color as the representative color of the pre-changed area 87 (the color of the tool 26) but do not correspond to the tool 26, even if the imaged site of the subject body has a similar color to the color of the tool 26. Thus, the changed area 72 detected based on the pre-changed area 87 will be confined in the representative color combining range 88 and will not substantially deviate from the image area of the tool 26.

The above-described detection process for detecting the pre-changed area 87 as a core area of the changed area 72 may not necessarily be executed on every frame of the captured image 71.

Figure 13:
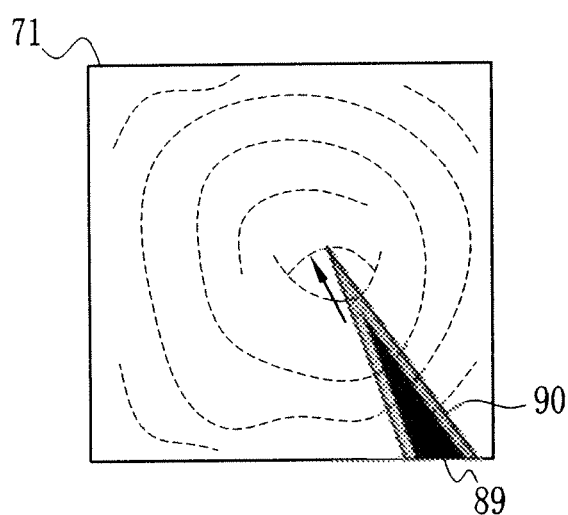
FIG. 13 is an explanatory diagram illustrating another embodiment wherein a changed area detected in the preceding image frame is used as a pre-changed area for detecting a changed area in a current image frame.

For example, as shown in FIG. 13, the changed area 72 as detected in the preceding image frame may serve as a new pre-changed area 89 for detecting a new changed area 90 in a newly input image frame through the clustering of those pixels having the same color as the representative color of the changed area 72 of the preceding image frame. This configuration still more speed the detection process for the changed area corresponding to the tool 26.

In the embodiment that uses the detected changed area 72 as a new pre-changed area 89 for detecting a new changed area 90 in the next image frame, the changed-area detector 61 should preferably execute not only the clustering process for combining pixels of the representative color with the pre-changed area 89 but also a process for putting those pixels which get different colors from the representative color out of the pre-changed area 89. Then, the changed area detected based on the pre-changed area 89 can exactly correspond to the tool 26 while it is being retracted from the imaging field as well as being protruded into the imaging field.

Figure 14:
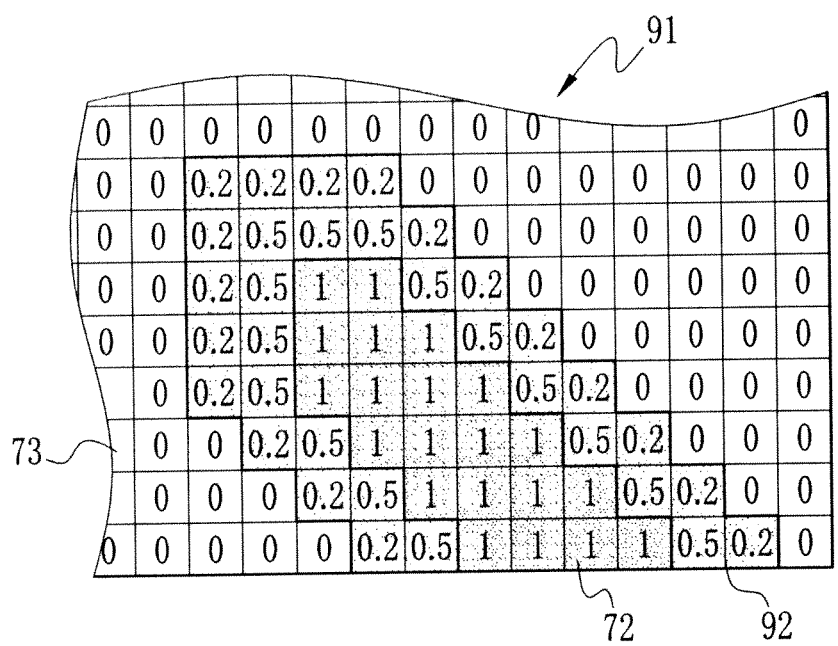
FIG. 14 is an explanatory diagram illustrating an embodiment wherein the mask data have multi levels from 0 to 1.

In the above embodiment, the mask data 74 produced according to the detected changed area 72 is binary data that allocates "0" or "1" to each pixel of the image 71, to discriminate between those pixels which are to be excluded from a particular kind of image processing, such as frequency enhancement, and those to be subjected to the image processing. However, mask data is not limited to the binary data. As shown in FIG. 14, mask data 91 may be multi-level data that allocates a value variable from 0 to 1 to each pixel of the image 71 depending on the relation to the detected changed area 72. For example, the mask data 91 allocates "1" to the pixels within the changed area 72, prohibiting the changed area 72 from being subjected to a particular kind of image processing, e.g. frequency enhancement. On the other hand, those pixels to which "0" is allocated are subjected to the image processing like in the above embodiment.

In the embodiment using the multi-level mask data 91, however, an intermediate area 92 is provided between a changed area 72 and an unchanged area 73. The intermediate area 92 may consist of those pixels which have changed to intermediate degrees between changed pixels of the changed area 72 and unchanged pixels of the unchanged area 73. The multi-level mask data 91 allocates intermediate values between 0 and 1 to the intermediately-changed pixels of the intermediate area 92, the intermediate values being variable depending upon the amount or rate of change in each pixel. Thus, the pixels in the intermediate area 92 are subjected to the image processing to varying degrees according to the values allocated by the mask data 91. For example, the pixel allocated with 0.2 will be frequency-enhanced at 20% less strength, whereas those allocated with 0.5 will be frequency-enhanced at 50% strength.

Providing the intermediate area 92 between the detected changed area 72 and the unchanged area 73 and adjusting the processing strength, e.g. the degree of enhancement, according to the pixel levels in the intermediate area 92 achieves fine image processing that still more improves the visibility of the image.

In the above embodiment, the multi-level mask data 91 is used for adjusting strength or degree of image processing on each individual pixel. In an alternative embodiment, the multi-level mask data 91 may be used for designating the mode of image processing to each pixel. For example, pixels of the changed area 72, to which "1" is allocated by the mask data 91 may be processed in the same way as in the ordinary inspection mode. On the other hand, pixels of the unchanged area 73, to which "0" is allocated may be processed in a way determined for the special inspection mode. In the intermediate area 92, a pixel level obtained through such image processing that should be executed commonly in the ordinary inspection mode and the special inspection mode and a pixel level obtained through specific image processing to the special inspection mode are averaged at a ratio variable according to the rate given to each pixel by the mask data 91, to determine a new pixel level for each pixel.

According to this method, intermediately-changed pixels of the intermediate area 92 are subjected to the common image processing to the ordinary inspection mode and the special inspection mode, and the image processing specific to the special inspection mode in a mixed way. For example, concerning the pixel to which "0.2" is allocated in the mask data 91, a pixel level obtained through the specific image processing to the special inspection mode and a pixel level obtained through the common image processing are respectively calculated, and then these pixel levels are added to each other at the ratio of 4:1, and then divided by 2, to provide a new pixel level for this pixel. Concerning the pixel to which "0.5" is allocated in the mask data 91, a pixel level obtained through the specific image processing to the special inspection mode and a pixel level obtained through the common image processing are added to each other at the ratio of 1:1, and then divided by 2, to provide a new pixel level for this pixel. The image processing may include, for example, enhancing processes suitable for the respective inspection modes. For example, the common image processing to the ordinary inspection mode and the special inspection mode may include a process for enhancing sharpness of the image, and the specific image processing to the special inspection mode may include a process for enhancing contrast of a particular structure, such as superficial blood vessels 76.

Using the multi-level mask data 91 and making two kinds of image processing selectively or at a variable mixing ratio on each pixel according to the value given to each pixel by the mask data 91, the image quality will be still more improved, and the border between the changed area 72 and the unchanged area 73 will get smoother. For example, the image data of the tool 26 may be subjected to an enhancing process suitable for the ordinary inspection mode, while the image data representative of the interior of the subject body may be subjected to an enhancing process suitable for the special inspection mode. Thus, different kinds of image processing are executed selectively within a single frame of image data, providing an optimum image for inspection.

Although the embodiments of the present invention have been described with respect to a situation where the tool 26 produced into the imaging field of the endoscope 12 is identified as the changed area 72, the present invention is applicable to any other cases in order to process image data appropriately and discriminatively between a living subject and an artificial object captured in the imaging field.

Figure 15:
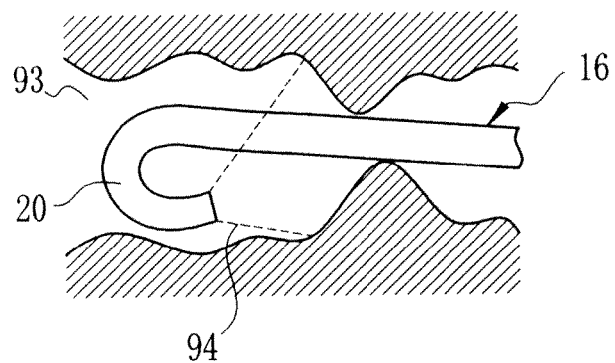
FIG. 15 is an explanatory diagram illustrating a position bending the distal end of a probing portion of the endoscope by almost 180 degrees.
Figure 16:
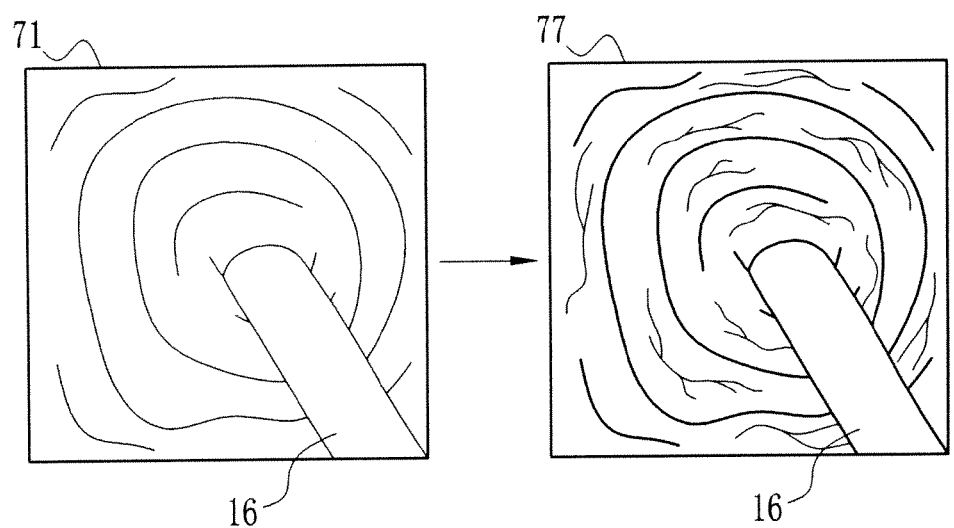
FIG. 16 is an explanatory diagram illustrating images captured in the position as shown in FIG. 15.

As shown for example in FIG. 15, the electronic endoscope system 11 may turn the distal end 20 of the probing portion 16 by almost 180 degrees in order to inspect the interior of a subject body 93 backwardly, for example, to inspect the cardiac orifice from inside the stomach after inserting the probing portion 16 of the endoscope 12 through the esophagus. In that case, the probing portion 16 will be captured in the imaging field 94 of the endoscope 12. Also in these cases, the electronic endoscope system 11 of the present invention can discriminate between the probing portion 16 and the biological subject 93 in the image 71, to process image data of these two kinds of subjects differently from each other, as shown for example in FIG. 16, such that superficial blood vessels 76 are enhanced in the image area corresponding to the biological subject 93 while the image area corresponding to the probing portion 16 is not subjected to the enhancement process or subjected to another type of image processing. Thus, the image of the probing portion 16 is prevented from being undesirably processed. Also in the case where the probing portion 16 is captured in the endoscopic image, the image area that will potentially contain the probing portion 16 is limited by the movable range of the distal end 20, and may therefore be predetermined as the designated area for the detection of the changed pixels like in the above embodiment.

In the above embodiments, the changed area 72 is detected from a newly input image frame to produce the mask data 74 according to the detected changed area 72, and process the image data on the basis of the mask data 74. In an alternative, as shown in FIG. 17, an input image may be not only subjected to the changed-area detection processes to produce the mask data 74 (steps S200 and S300), but also to the common image processing to the ordinary inspection mode and the special inspection mode to produce a first inspection image (step S700), and to the image processing specific to the special inspection mode to produce a second inspection image as well (step S800). Thereafter, these inspection images may be synthesized according to the mask data 74 to produce a composite inspection image to be displayed on the monitor 22 (step S900). For example, the composite inspection image may be produced by applying pixel levels of the second inspection image to pixels of the changed area 72, to which the mask data 74 allocates a value "0", and pixel levels of the first inspection image to pixels of the unchanged area 73, to which the mask data 74 allocates a value "1".

Producing the first inspection image and the second inspection image in parallel to each other, and composing an inspection image from these images according the mask data 74 may facilitate calculation of pixel levels in the intermediate area 92 using the multi-level mask data 91 as described with reference to FIG. 14.

Although pixel levels of the input image 71 are used for detecting the changed area 72 in the above embodiments, the changed area 72 may also be detected on the basis of changes in other properties of the input image 71, such as luminance, RGB color balance, macro structures of the captured subject, or any combination of these properties.

The present invention may also preferably apply to those cases where the electronic endoscope can operate only in the ordinary inspection mode, but most preferably apply to those using the endoscope that can operate in the special inspection mode as well. This is because the special inspection mode needs to execute various kinds of image processing selectively according to the variable target subjects, like whether superficial blood vessels or middle-layer to deeper blood vessels, and hence bears higher risk of degrading the visibility of such images that contain an artificial object like the surgical tool 26.

The present invention is especially useful for those electronic endoscope systems which serve for EMR (endoscopic mucosal resection) or ESD (endoscopic submucosal dissection), as using surgical tools frequently.

Although the above embodiments use the CCD 21 as the imaging device, the imaging device may alternatively be a CMOS image sensor. Moreover, the present invention may also preferably apply to a system where the imaging device is not provided with the color filter array but a rotary color filter is mounted in front of the imaging device, to capture different color frames, which are combined into a multi-color image.

Although the CCD 21 is mounted in the distal end of the endoscope 12 in the above embodiments, the imaging device like the CCD 21 may be is disposed in any appropriate position, e.g. in the processor unit 13.

Although the present invention has been described with respect to the embodiment where the white light is produced using the blue LD 66 and the light projection unit 41 having the phosphor 43, the ordinary illumination light may be produced in any appropriate manner. For example, a well-known white light source like a xenon lamp is applicable. Moreover, the special light may be produced using the white light source and an appropriate filter, instead of the violet blue LD 67.

Although the special light is projected in addition to the ordinary light in the special inspection mode of the above embodiments, the present invention is applicable to those cases where only the special light is projected in the special inspection mode.

Furthermore, the present invention is preferably applicable to those cases where the special light may be projected as rays of different wavelength bands, although the above embodiment is configured to project the ordinary light and only one kind of special light.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

What is claimed is:

1. An electronic endoscope system comprising:
   an electronic endoscope that can be inserted into a test subject to capture images of the interior of the test subject;
   a changed-area detecting device for detecting a changed area in an image captured by said electronic endoscope using data of the captured image, the changed area having different features from other area of the captured image and corresponding to an artificial object;
   a mask data producing device for producing mask data based on the detected changed area, the mask data allocating an image processing parameter to each pixel of the captured image such that the changed area is processed in a different way from the other area; and
   an image processing device for processing the captured image according to the mask data,
   wherein a region containing the artificial object is not enhanced while a remainder of the image is enhanced, and
   wherein said changed-area detecting device detects the changed pixels in a designated partial area of the captured image, combines the changed pixels into clusters, determines among these clusters such clusters that are equal to or greater than a predetermined size to be pre-changed areas, detects those pixels having the same color as a representative color of the pre-changed areas outside the pre-changed areas to combine with the pre-changed areas into clusters, and determines among these clusters such a cluster that is equal to or greater than the predetermined size to be the changed area.

2. The electronic endoscope system as recited in claim 1, wherein said changed-area detecting device detects those pixels as changed pixels from the captured image which have changed beyond a predetermined degree, combines the changed pixels into clusters, and determines among the clusters of changed pixels such a cluster that is equal to or greater than a predetermined size to be the changed area.

3. The electronic endoscope system as recited in claim 2, wherein said changed-area detecting device detects those pixels having levels of not less than a predetermined first threshold level as the changed pixels.

4. The electronic endoscope system as recited in claim 2, wherein said changed-area detecting device stores a basic image as a basis for detecting changes in pixels, calculates differences in individual pixels between the basic image and the captured image, and detects those pixels in which the calculated differences are not less than a second threshold level as changed pixels.

5. The electronic endoscope system as recited in claim 2, wherein said changed-area detecting device detects those pixels having levels of not less than a predetermined first threshold level as the changed pixels until a predetermined time has passed since a start of insertion of said electronic endoscope into the test subject, and after the predetermined time has passed, said changed-area detecting device stores a basic image as a basis for detecting changes in pixels, calculates differences in individual pixels between the basic image and the captured image, and detects those pixels in which the calculated differences are not less than a second threshold level as changed pixels.

6. The electronic endoscope system as recited in claim 3, wherein the captured image comprises a color image containing red pixels, and the first threshold level is predetermined based on pixel levels of the red pixels.

7. The electronic endoscope system as recited in claim 4, wherein the basic image is defined by average data values of previously captured images.

8. An electronic endoscope system comprising:
   an electronic endoscope that can be inserted into a test subject to capture images of the interior of the test subject;
   a changed-area detecting device for detecting a changed area in an image captured by said electronic endoscope using data of the captured image, the changed area having different features from other area of the captured image and corresponding to an artificial object;
   a mask data producing device for producing mask data based on the detected changed area, the mask data allocating an image processing parameter to each pixel of the captured image such that the changed area is processed in a different way from the other area; and
   an image processing device for processing the captured image according to the mask data,
   wherein a region containing the artificial object is not enhanced while a remainder of the image is enhanced,
   wherein said changed-area detecting device detects those pixels as changed pixels from the captured image which have changed beyond a predetermined degree, combines the changed pixels into clusters, and determines among the clusters of changed pixels such a cluster that is equal to or greater than a predetermined size to be the changed area,
   wherein said changed-area detecting device stores a basic image as a basis for detecting changes in pixels, calculates differences in individual pixels between the basic image and the captured image, and detects those pixels in which the calculated differences are not less than a second threshold level as changed pixels, and
   wherein said changed-area detecting device uses a previous image frame captured before a current image frame as the basic image for detecting a changed area in the current image frame; and said mask data producing device produces pre-mask data based on the changed area detected using the basic image, and stores the mask data as produced for the previous image frame, to produce new mask data for the current image frame based on the pre-mask data and the mask data for the previous image frame.

9. The electronic endoscope system as recited in claim 1, wherein the designated area is located in a position where an artificial tool begins to enter the captured image.

10. The electronic endoscope system as recited in claim 9, wherein the designated area is switchable according to the type of said electronic endoscope.

11. The electronic endoscope system as recited in claim 1, wherein the pixels having the same color as the representative color of the pre-changed area are to be detected and combined with the pre-changed area within a predetermined range adjacent to the designated area.

12. The electronic endoscope system as recited in claim 1, wherein said changed-area detecting device uses a changed area detected in a previous image frame captured before a current image frame as a pre-changed area for the current image frame, detects those pixels having the same color as a representative color of the pre-changed area outside the pre-changed area, and combines these pixels with the pre-changed area to detect a new changed area in the current image frame.

13. The electronic endoscope system as recited in claim 1, wherein said mask data include binary parameters for switching a particular kind of image processing ON or OFF to each pixel.

14. The electronic endoscope system as recited in claim 1, wherein said mask data includes parameters for determining magnitude of a particular kind of image processing.

15. The electronic endoscope system as recited in claim 1, wherein said mask data is multi-level data for determining magnitude of a particular kind of image processing, including a parameter value to be allocated to pixels of the changed area, a parameter value to be allocated to pixels of an unchanged area, and at least a parameter value to be allocated to those pixels which have changed intermediately between the pixels of the changed area and the pixels of the unchanged area.

16. The electronic endoscope system as recited in claim 15, wherein said image processing device processes the pixels of the changed area through a first kind of image processing, the pixels of the unchanged area through a second kind of image processing, and the intermediately-changed pixels through the first and second kinds of image processing at a variable ratio of mixture determined by the mask data.

17. The electronic endoscope system as recited in claim 1, wherein said image processing device produces a first image from the captured image through a first kind of image processing and a second image from the captured image through a second kind of image processing, and synthesizes the first and second images into a composite image according to the mask data.

18. The electronic endoscope system as recited in claim 1, wherein said image processing device makes at least an enhancing process for enhancing particular structures of the test subject contained in the captured image on the basis of the mask data.

19. An image processing method comprising:
capturing images of the interior of a test subject by an electronic endoscope inserted into the test subject;
detecting a changed area in an image captured by said electronic endoscope using data of the captured image, the changed area having different features from other area of the captured image and corresponding to an artificial object;
producing mask data based on the detected changed area, said mask data allocating an image processing parameter to each pixel of the captured image such that the changed area is processed in a different way from the other area; and
processing the captured image according to the mask data,
wherein a region containing the artificial object is not enhanced while a remainder of the image is enhanced, and
wherein said detecting a changed area comprises detecting the changed pixels in a designated partial area of the captured image, combining the changed pixels into clusters, determining among these clusters such clusters that are equal to or greater than a predetermined size to be pre-changed areas, detecting those pixels having the same color as a representative color of the pre-changed areas outside the pre-changed areas to combine with the pre-changed areas into clusters, and determining among these clusters such a cluster that is equal to or greater than the predetermined size to be the changed area.

* * * * *